2,736,683

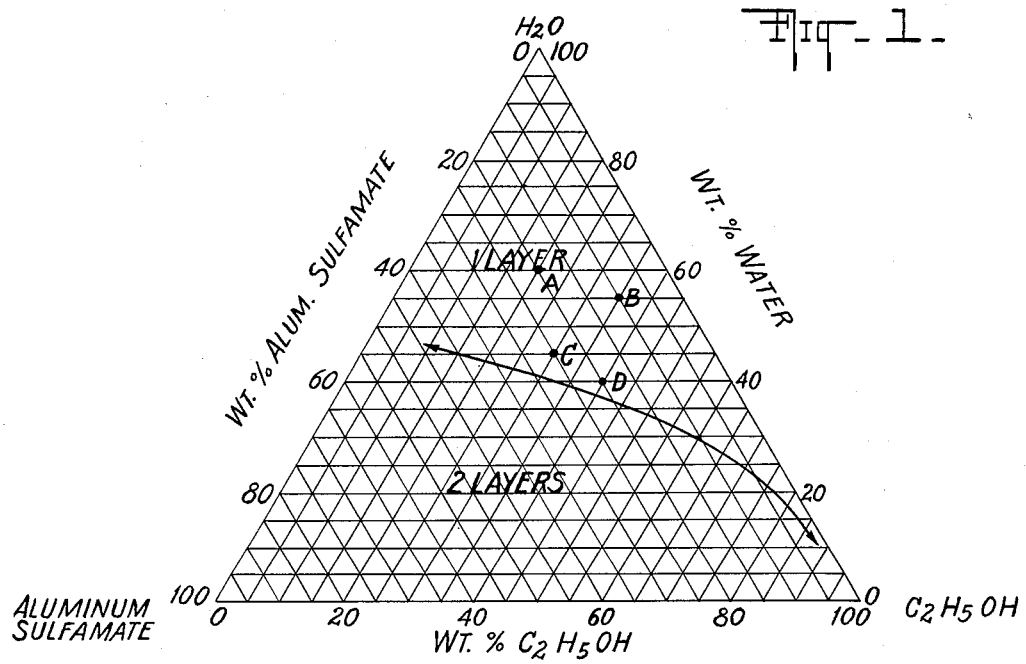
Fig. 1.
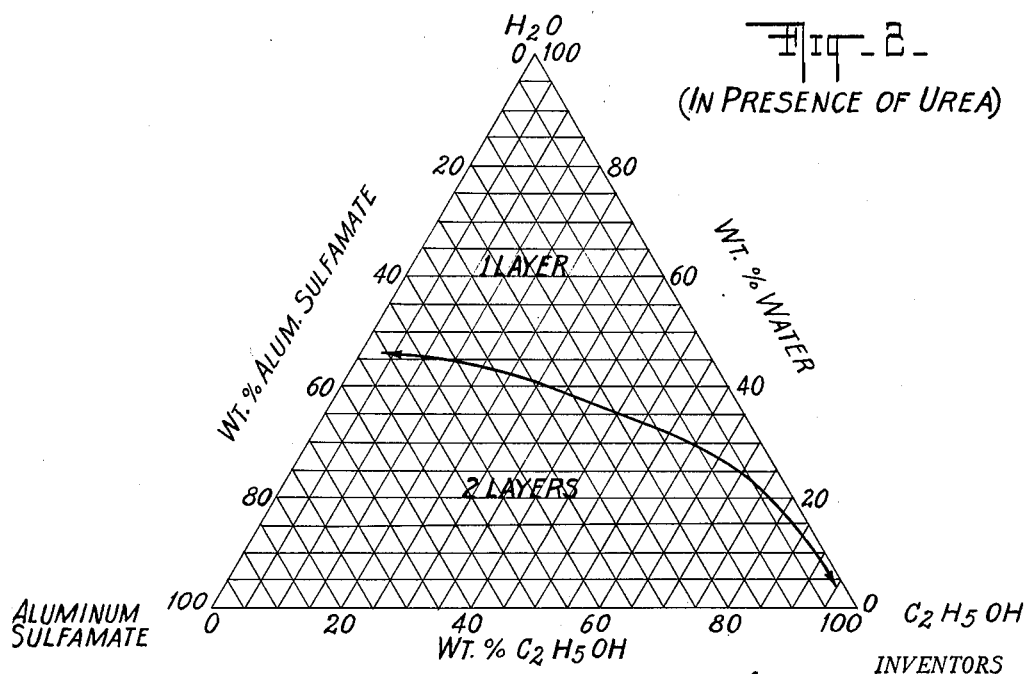
Fig. 2. (In Presence of Urea)
INVENTORS
LESTER D. APPERSON
EARL L. RICHARDSON
BY Murray M. Grill
ATTORNEY

United States Patent Office 2,736,683
Patented Feb. 28, 1956

ALUMINUM SULFAMATE ANTIPERSPIRANT LIQUID

Lester D. Apperson, Convent Station, N. J., and Earl L. Richardson, Elkhart, Ind., assignors to Colgate-Palmolive Company, Jersey City, N. J., a corporation of Delaware Application December 19, 1951, Serial No. 262,464

7 Claims. (Cl. 167—90)

The present invention relates to a liquid preparation for inhibiting or retarding perspiration comprising aluminum salt of sulfamic acid, and more specifically, to an antiperspirant liquid comprising aluminum sulfamate in an aqueous alcoholic solution, particularly suitable for use as an antiperspirant spray.

Among the many antiperspirants described as having the property of retarding or inhibiting the flow of perspiration the most common have been considered heretofore to be those containing aluminum salts of strong inorganic acids, e. g. hydrochloric, sulfuric, etc. Cosmetic preparations containing salts of these strong acids, however, have the very serious disadvantage of corroding or tendering clothing fabric, e. g., portions of garments which come in contact with the preparation during or after its application to areas of the body. This corrosive action is especially noticeable on fabrics containing cellulosic materials such as cotton, rayon and the like. The corrosive effect that is detrimental to fabrics manifests itself particularly where the clothing portion carrying some of the antiperspirant material is ironed or otherwise subjected to a relatively high temperature before removal of the antiperspirant preparation. Even long continued contact at ordinary temperatures of cosmetic preparations containing aluminum salts of these mineral acids causes weakening or deterioration of the clothing fabric. This corrosive action is so severe that considerable research and investigation has been directed to possible means for minimizing such undesirable effects.

In general, a popular type of antiperspirant composition has been the antiperspirant creams which usually contain emulsifying agents and other ingredients to achieve the desired state. Such a product is a rather complex mixture and therefore subject to certain possible undesirable characteristics and considerations, such as the stability of the various added ingredients and of the emulsion, etc.

Within recent years, the spray type deodorant antiperspirant compositions have appeared on the market. Such a product essentially is a solution containing the antiperspirant which is packaged in a polyethylene or similar plastic bottle equipped with a small orifice whereby the material is propelled or discharged from the container in the form of a spray or mist by manual pressure upon the bottle. Such products usually consist of the antiperspirant ingredient in aqueous solution. The use of a solution in conjunction with such a specific mode of application requires consideration of certain factors in order to achieve maximum effectiveness and ease of application. Where a third essential ingredient is incorporated into an aqueous antiperspirant solution, there occurs a multi-component system having characteristics and problems unique therewith. Thus, the preparation of such a complex system is often a specialty problem, as will be further apparent herein.

It has now been discovered that an antiperspirant composition having many superior characteristics may be prepared by formulating an effective amount of aluminum salt of sulfamic acid in an aqueous alcoholic medium, said composition having essentially a single homogeneous liquid layer suitable for use as an antiperspirant spray. As a preferred embodiment, the present invention also comprises an effective amount of aluminum sulfamate from about 5 up to about 50% by weight in a liquid medium of water and ethyl alcohol, said ternary mixture of ingredients being proportioned to form a homogeneous liquid solution. The novel liquid compositions of the present invention are further characterized by superior antiperspirant activity, substantial non-corrosiveness to clothing fabrics, effective penetration and fast drying of the sprayed film after application usually accompanied with a mild cooling effect, provision for perfume oil incorporation, etc.

The aluminum salt of sulfamic acid is a very efficacious perspiration retarder having been found by tests to be definitely superior to the aluminum salt of sulfuric acid, for example, in this respect. Test data have further illustrated such desirable characteristics. To secure such data, specific areas of skin of a number of human subjects were treated daily over a definite period and the perspiration inhibiting effects for aluminum sulfate and aluminum sulfamate were evaluated. The perspiration from two equal, comparable areas of skin with and without antiperspirant treatment was periodically collected and weighed. For each measurement a per cent of perspiration-lessening effect was calculated as follows:

Where
$X$=weight of perspiration on untreated area, and
$Y$=weight of perspiration on like area treated with antiperspirant material,
then, the perspiration-lessening effect, as represented by $(Z)$, expressed in percent, is as follows:

$$Z = \frac{X-Y}{X} \times 100$$

The results obtained from the tests showed that aluminum sulfamate was from three to six or more times as effective as aluminum sulfate when comparable concentrations were used.

Another primary characteristic is that aluminum sulfamate is substantially non-tenderizing or non-corrosive to clothing fabrics. Antiperspirant preparations containing aluminum sulfamate as the active ingredient may be used without the addition of corrosion-inhibiting agents, in contrast to other aluminum salts such as the sulfate and chloride. The relative non-corrosiveness of aluminum sulfamate on cotton fabrics and the like in comparison to such commonly known materials as aluminum sulfate and aluminum chloride may be readily ascertained also by suitable testing procedures wherein the product is applied to the cloth and its effect on the tensile strength determined by suitable means, such as on a Scott tensile strength testing machine.

The proportion of aluminum sulfamate antiperspirant ingredient to the total composition may be rather widely varied and depends to some extent upon the particular effects desired, frequency of use, and other variable factors. In general, a composition should contain sufficient aluminum sulfamate to be effective when the usual amount of the preparation is applied to the skin and no more should ordinarily be present than can be held by the solution homogeneously. Satisfactory results may be obtained in compositions in which the proportionate quantity of aluminum sulfamate incorporated ranges from about 5% up to about 50% by weight of the antiperspirant perparation, and a preferred range lies between about 10% to 30% by weight.

Aqueous solution of aluminum sulfamate suitable for use in compounding the antiperspirant compositions of the invention may be prepared by any appropriate method, such as by reaction of a theoretical amount of sulfamic acid with aluminum hydroxide gel to give a clear solution of aluminum sulfamate. Another method which may be used comprises the reaction of barium sulfamate in an aqueous medium with a theoretical amount of aluminum sulfate to form insoluble barium sulfate which may be removed to leave a clear solution of aluminum sulfamate.

Under certain severe conditions where aluminum sulfamate is improperly applied to clothing, and the same is not removed by previous washing or cleaning, there may result some discoloration of cellulosic fibers upon ironing, pressing, or the like. The discoloration appears as yellowish to brown cast when applied to and dried by heat on white fabrics made of cotton, linen, or regenerated cellulosic fibers. This discoloration tendency can be prevented or satisfactorily lessened by incorporating in the antiperspirant preparation certain organic compounds which should be soluble in aqueous alcoholic aluminum sulfamate and which does not precipitate therefrom a compound containing aluminum. Compounds found to aid in preventing this discoloration, for convenience, may be classified into four general groups as follows:

Group I

Amides which are neutral and contain the functional group

and are soluble in aqueous aluminum sulfamate and which do not precipitate therefrom a compound containing aluminum, for example: urea, ethyl carbamate, formamide, and acetamide. The word "neutral" is used herein to mean that the compounds are practically unionized in aqueous solution.

Group II

Amino carboxylic acids which contain the functional group $\equiv$C—NH$_2$ and are soluble in aqueous aluminum sulfamate and which do not precipitate therefrom a compound containing aluminum, for example: glycine, α-alanine and β-alanine;

Group III

Compounds which are salts of non-hydroxy saturated carboxylic acids and ammonia bases, and which compounds are soluble in aqueous aluminum sulfamate and do not precipitate therefrom a compound containing aluminum. The ammonia base may be the unsubstituted ammonia, or hydrogen may be replaced by one or more alkyl radicals and this base when reacted with said carboxylic acid yields compounds such as, for example: diammonium malonate, ammonium acetate, diammonium oxalate, monoethanolamine acetate and triethanolamine acetate.

Group IV

Compounds which contain the functional group

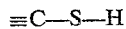

and are soluble in aqueous aluminum sulfamate and which do not precipitate therefrom a compound containing aluminum, for example: sodium mercaptopropanesulfonate (1,2), sodium 2-mercaptoethane-1-sulfonate, ammonium 2-mercaptoethane-1-sulfonate, ammonium thioglycolate, thioglycolic acid, thiourea and ethylene thiourea.

The extent of solubility of the substance used as a discoloration inhibitor in the aqueous alcoholic sulfamate solution may vary with the various compounds and it is essential only that a sufficient quantity of the substance used go into solution to suitably inhibit the discoloration. In some cases the substance may be present in the composition in amounts greater than the limit of solubility without disadvantage. Further, the inhibiting substance used should not reduce the antiperspirant property of the aluminum sulfamate, nor should it cause the finished preparation to have an unduly objectionable odor, color or other undesirable characteristics such as cause irritation.

The proportion of inhibitor required to prevent discoloration varies with the particular inhibitor. In general, when employing Group I, Group II and Group III compounds at least an equal molar proportion of the discoloration inhibitor to that of aluminum sulfamate is sufficient, and preferably about two to three mols of those inhibitors for each mol of aluminum sulfamate in solution is employed. With Group IV compounds about ¼ mol per mol of aluminum sulfamate is sufficient usually. Greater or less quantities of the discoloration inhibitor, or mixtures of different inhibitor compounds may of course be used however.

The alcohol in the liquid compositions of the present invention performs a multiplicity of functions such that the liquid composition in its unitary effects exhibits the desired properties. By its incorporation in the proper formulation, it enables the water content to be kept at a low value. A primary characteristic is that a quick-drying product is obtained, which promotes faster drying of the sprayed film after application with a resultant cooling effect generally. Furthermore, a supplementary deodorant and antiseptic effect is usually exerted upon application temporarily. A large number of adjuvant substances may be incorporated therein by virtue of the modified solubility characteristics. Thus, suitable perfume oils and other essential oils may be added thereto in proper amount without precipitation, in addition to various other substances such as germicides, etc. Any suitable alcohol having the desired miscibility with water may be used, such as the lower saturated aliphatic monohydric alcohol, e. g., ethyl alcohol, n-propanol, isopropanol, (including suitable mixtures thereof), etc.

Any suitable amount of alcohol may be employed since usually any proportion thereof will serve to lower the surface tension. In general, it is considered that the alcohol content should be at least about 5% and preferably from about 10 to 50% by weight for a characteristic fast drying product, its proportion being integrated with the amount of water and antiperspirant ingredient. The alcohol will usually be admixed with the aqueous aluminum sulfamate solution in appropriate amount with suitable adjustment of the water content if necessary. It is requisite that such mixture of ingredients exist as a single relatively homogeneous liquid layer for many reasons. Where the concentrations of these ingredients are not coordinated properly, the product may form two distinct opposing liquid layers. Each of these layers will contain varying concentrations or the ingredients, different viscosity, varying ease of application, and possible diversity of resulting effects, etc. Such non-uniformity of the product is obviously undesirable and of primary consideration to its commercial saleability and acceptance and to its effectiveness to achieve the desired results.

Such effects may be illustrated by the accompanying figures setting forth certain phase relationships of the essential ingredients. Figure 1 is a ternary phase diagram of the water-absolute alcohol-aluminum sulfamate system, the phase relationships being determined at room temperature and normal atmospheric pressure by the additions of varying amounts of alcohol to various concentrations of aqueous aluminum sulfamate. The curve shown therein is believed to have the probable critical curvature indicated based on experimental data. It indicates however certain necessary considerations and will serve to some degree as a practical guide in formulation work.

Any point under the critical curve such as is illustrated for example in Figure 1 represents a ternary mixture which will separate into two liquid layers; any point above the curve representing a single homogeneous liquid layer. It will be apparent therein that the homogeneity or uniformity of this system is dependent upon the proper formulation of the concentrations or weight ratio of these ingredients in this essentially three-component system. An aqueous solution of aluminum sulfamate is homogeneous within its inherent solubility characteristics. When alcohol is added thereto, the amount of water and aluminum sulfamate remaining constant, a homogeneous liquid layer will remain up to a particular concentration of alcohol. If further amounts of alcohol are added (or sufficient aqueous aluminum sulfamate removed), the mixture will eventually separate into two layers, each of these two immiscible solutions having varying ratios of ingredients. Within the phase diagram are set forth points Nos. A–D, each representing a suitable homogeneous solution (as opposed to two immiscible liquid layers), the composition on the basis of 100% for the three ingredients being equal to the distances from the vertices to the appropriate sides of the triangle when three lines are drawn from the indicated point parallel to the three sides. Point A thus represents a mixture containing about 20% aluminum sulfamate, 60% water and 20% absolute alcohol; point B representing 10% aluminum salt, 55% water and 35% alcohol; point C being 25% aluminum salt, 45% water and 30% alcohol; and point D being 20% aluminum salt, 40% water and 40% alcohol. Thus, it will be evident, for example, that there is a critical phase relationship between such three components and that under ordinary conditions the amounts thereof should be proportioned so as to form a homogeneous single liquid layer or solution (as opposed to two immiscible liquid layers).

Figure 2 shows a similar curve of the water-alcohol-aluminum sulfamate system, the alcohol coordinate in this instance being S. D. #40 95% alcohol. This curve was prepared in the presence of 5% urea in the system, all calculations for convenience being made on a urea-free basis. It will be evident therein that the general curvature indicated in Figure 2 is similar to Figure 1, the presence of urea as a discoloration inhibitor not materially affecting the phase relationships.

It is preferred therefore that the liquid compositions have an effective amount of aluminum salt or sulfamic acid from about 5 up to about 50%, from about 5 to about 70% alcohol and about 25 to about 90% water, said percentages being by weight based on a ternary mixture of the same and being an essentially single homogeneous liquid layer. These proportions may also be suitably expressed in parts by weight, since they represent the ratio of the three essential ingredients.

In any selected system there are a number of variables. The shape of the curves and therefore maximum limits of ingredients is influenced by temperature and pressure for example. The curves will also be influenced theoretically by the addition of any added materials such as perfumes, the optional discoloration inhibitors, solubilizing agents, wetting agents, etc. Whether the desired state is produced by a particular formulation however is of course an observable phenomenon and readily determinable as illustrated herein.

As indicated, various adjuvant materials may be incorporated therein in suitable amounts. Thus, the product may ordinarily contain a perfume which should be compatible therein. Minor amounts of emollients such as glycerine, propylene glycol, sorbitol and the like may be added also provided the essential character of the product is maintained properly. Suitable coloring materials may also be added similarly if desired.

It is an added feature of the present invention that a surface-active material or agent may be incorporated therein. Any suitable agent having wetting characteristics and stable in acid media may be added, such wetting agents usually containing a long aliphatic chain and may be anionic, non-ionic or cationic in character. By such use, increased wetting of the desired area is obtained including generally more effective penetration or application of the antiperspirant. Such materials also aid in dispersing or solubilizing, and in added bacteriostatic or similar effects, such as with the use of quaternary ammonium compounds. These materials should be applied in minor amount soluble in the aqueous alcoholic sulfamate solution. Usually up to about 1% by weight of these materials will be sufficient. Excessive amounts are not necessary, particularly where the surface-active agent has significant foaming tendencies, though in the relationship set forth the presence of alcohol will usually tend to inhibit such effects. Suitable wetting agents are the water-soluble salts of higher fatty acid monoglyceride monosulfate, such as sodium monosulfate monoglyceride of coconut acids; higher alkyl sulfates such as sodium lauryl sulfate; higher alkyl aryl sulfonate such as sodium dodecyl benzene sulfonate, quaternary ammonium germicides such as N-(myristic acid ester of colaminoformylmethyl) pyridinium chloride; etc.

Though the liquid preparations of the present invention have been described for effective use as an antiperspirant spray, they may obviously be employed in other relationships where a homogeneous aqueous alcoholic solution is desired, either for direct application or for use in other antiperspirant products. It may be employed either with or without the alcohol in an aerosol type dispenser or bomb under pressure in combination if desired with a propellent or liquefied normally gaseous substance.

As propellents, any suitable normally gaseous organic substance (or mixtures) may be used. In general, they should be substantially non-toxic, non-inflammable, odorless, etc. It is preferred to use the normally gaseous low molecular weight halogenated hydrocarbon propellents, such as halogenated ethane, halogenated methane, and mixtures thereof in view of their high volatility at usual atmospheric conditions, stability in and miscibility with suitable solvent mediums such as aqueous alcoholic solutions, etc. The halogenated hydrocarbon propellents such as dichlorodifluoromethane, monochloro-difluoro-ethane, dichlorotetrafluorethane, etc., and known in the art as the "Genetrons" and "Freons" have been found to be particularly suitable. Other propellents such as methyl chloride are also suitable. The amount of propellent may be varied depending on the properties desired in the final product. In general, it need only be sufficient to satisfactorily propel or eject the material satisfactorily from the container. It is preferred to use at least about 5%, preferably about 10% to about 20%, propellent by weight of the total liquid composition, though higher amounts may be used if desired, e. g., up to about 30%.

These compositions may be prepared in any suitable manner. One satisfactory method is to add the aqueous alcoholic antiperspirant solution to the pressure container or aerosol bomb which is subsequently sealed. Thereafter, the propellent while under pressure may be admitted to the container through a valve or other appropriate means, the container generally being slightly chilled during this operation. Another satisfactory method is to prechill the alcoholic solution of the various ingredients and the propellent, either individually or as a mixture below the boiling point of the propellent, and charge them into the container which is sealed thereafter.

The following additional formulations are further illustrative of the nature of the present invention, and it is to be understood that the invention is not limited thereto.

All percentages are by weight unless otherwise indicated:

Example I

| | Per cent |
|---|---|
| Aluminum sulfamate | 18.0 |
| Water | 36.8 |
| Ethanol | 40.0 |
| Urea | 5.0 |
| Perfume | 0.2 |

Example II

| | Per cent |
|---|---|
| Aluminum sulfamate | 12.0 |
| Water | 49.3 |
| Ethanol | 35.0 |
| Glycine | 3.5 |
| Perfume | 0.2 |

Example III

| | Per cent |
|---|---|
| Aluminum sulfamate | 10.0 |
| Water | 59.8 |
| Ethanol | 30.0 |
| Quaternary ammonium germicide [1] | 0.2 |

[1] N-(myristic acid ester of colaminoformylmethyl) pyridinium chloride.

Example IV

| | Per cent |
|---|---|
| Aluminum sulfamate | 10.0 |
| Water | 79.8 |
| Isopropanol | 10.0 |
| Perfume | 0.2 |

Example V

| | Per cent |
|---|---|
| Aluminum sulfamate | 15.0 |
| Water | 59.8 |
| Ethanol | 25.0 |
| Triton X-200—sodium salt of alkylated aryl polyether sulfonate | 0.2 |

The instant application is a continuation-in-part of application S. N. 64,905 filed December 11, 1948, now U. S. Patent No. 2,586,288 issued February 19, 1952.

Although the invention has been described in detail and exemplified by a number of examples, it will be apparent that many changes and modifications may be made within the principles of the invention.

Having described the invention, what is desired to be secured by Letters Patent is:

1. A liquid preparation for inhibiting or retarding perspiration comprising aluminum salt of sulfamic acid in an effective amount from about 5 to about 50% by weight in an aqueous lower saturated aliphatic monohydric alcoholic medium, said alcohol being at least about 5% by weight and said composition having essentially a single homogeneous liquid layer.

2. A liquid composition in accordance with claim 1 admixed with liquefied normally gaseous low molecular weight halogenated hydrocarbon propellent.

3. A liquid composition for inhibiting or retarding perspiration comprising aluminum sulfamate in an effective amount from about 5 up to about 50% by weight in a liquid medium of water and at least about 5% by weight of ethyl alcohol, said composition being a homogeneous liquid solution.

4. A liquid composition for inhibiting or retarding perspiration comprising aluminum salt of sulfamic acid in an effective amount from about 5 to about 50% by weight in an aqueous alcoholic liquid medium, the alcoholic content being from about 5 to about 50% by weight of a lower saturated aliphatic monohydric alcohol, said composition having essentially a single homogeneous liquid layer.

5. A liquid composition for inhibiting or retarding perspiration comprising aluminum salt of sulfamic acid in an effective amount from about 5 up to about 50%, from about 5 to about 70% ethanol and about 25 to about 90% water, said percentages being by weight based on a ternary mixture of the same and being an essentially single homogeneous liquid layer.

6. A liquid composition in accordance with claim 5 containing a minor amount of a surface active agent.

7. A liquid composition in accordance with claim 5 admixed with liquefied normally gaseous low molecular weight halogenated hydrocarbon propellent.

References Cited in the file of this patent

UNITED STATES PATENTS

| 1,621,528 | Ellis | Mar. 22, 1927 |
|---|---|---|
| 2,586,288 | Apperson | Feb. 19, 1952 |

OTHER REFERENCES

De Navarre: Chemistry and Manufacture of Cosmetics (1942), p. 298.

Thomssen: Modern Cosmetics, 3rd ed. (1947), pp. 239 to 242.